United States Patent [19]

Murasugi et al.

[11] Patent Number: 4,640,395

[45] Date of Patent: Feb. 3, 1987

[54] SLIP CONTROL MECHANISM FOR FRICTION CLUTCH IN TORQUE CONVERTER OF AUTOMATIC POWER TRANSMISSION

[75] Inventors: Takashi Murasugi; Masaaki Suga, both of Yokohama; Yasuhiro Niikura, Yokosuka, all of Japan

[73] Assignee: Nissan Motor Company, Limited, Kanagawa, Japan

[21] Appl. No.: 657,953

[22] Filed: Oct. 5, 1984

[30] Foreign Application Priority Data

Oct. 7, 1983 [JP] Japan .................................. 58-186885

[51] Int. Cl.⁴ ...................... B60K 41/02; F16D 47/06
[52] U.S. Cl. ................................. 192/3.31; 192/0.076; 192/103 R
[58] Field of Search .................... 192/0.076, 3.31, 3.3, 192/3.32, 3.33, 3.29, 3.28, 103 R, 0.032, 0.033, 0.034; 74/731, 732, 733

[56] References Cited

U.S. PATENT DOCUMENTS

| | | | |
|---|---|---|---|
| 3,966,031 | 6/1976 | Peterson et al. | 192/3.3 |
| 3,972,397 | 8/1976 | Cheek | 192/3.3 |
| 3,977,502 | 8/1976 | Chana | 192/3.31 |
| 4,002,228 | 1/1977 | Borman | 192/3.3 |
| 4,169,526 | 10/1979 | Malloy | 192/3.3 |
| 4,360,090 | 11/1982 | Wonn | 192/3.3 |
| 4,373,617 | 2/1983 | Mathlies | 192/3.31 |

Primary Examiner—George H. Krizmanich
Attorney, Agent, or Firm—Schwartz, Jeffery, Schwaab, Mack, Blumenthal & Evans

[57] ABSTRACT

A slip control mechanism comprises a throttling path with a cross-sectional area variable according to the relative displacement of an output element of a torque converter and an output shaft. The throttling path is in communication via a fluid passage with a disengagement chamber opposing one side of a friction clutch. The other side of the friction clutch faces an engagement chamber. The disengagement chamber and the engagement chambers are so arranged as to control slippage of the friction clutch by pressure balance therebetween. The throttling path is formed in a specific geometry which assures moderate changes in the pressure balance between the disengagement chamber and engagement chamber in an intermediate throttling range. In the preferred construction, the throttling path is so constructed that the rate of change of the throttling cross-sectional area satisifes the inequality $$d^2S/dx^2 \geq$$

where
S is the cross-sectional area of the throttling path, and
x is the relative displacement of the output element of the torque converter and the output shaft.

16 Claims, 18 Drawing Figures

SLIP CONTROL MECHANISM FOR FRICTION CLUTCH IN TORQUE CONVERTER OF AUTOMATIC POWER TRANSMISSION

BACKGROUND OF THE INVENTION

The present invention relates generally to a torque converter with a friction clutch applicable to automotive automatic power transmissions. More particularly, the invention relates to a slip control for the friction clutch which provides better transition characteristics between hydrodynamic drive and mechanical drive.

U.S. Pat. No. 3,933,031 to Peterson et al and U.S. Pat. No. 4,002,228 to Borman disclose torque converters of automatic power transmissions including friction clutch slip control mechanisms. Both of these slip control mechanisms control friction clutch slippage by controlling working fluid pressure in a disengagement chamber relative to that in an engagement chamber. Pressure control is performed by adjusting the cross-sectional area for introducing pressurized working fluid into the disengagement chamber. In order to adjust the cross-section, a throttling fluid path is defined in communication with the disengagement chamber. The cross-section of the throttling path varies according to the relative movement of a turbine runner serving as an output element of a torque converter and a output shaft.

In these conventional slip controls techniques, the throttling rate changes relatively slowly near the minimum and maximum cross-sections. On the other hand, the rate of change of the throttling rate in the intermediate range is relatively high, where most slip control is practically carried out. As a result, fluid pressure in the disengagement chamber varies at a relatively high rate in the intermediate throttling range. This unavoidably causes hunting of the fluid pressure balance between the disengagement chamber and engagement chamber, and thus between the hydrodynamic drive state and the mechanical drive state. Abrupt clutch release and engagement due to significant changes in the pressure balance between the disengagement chamber and engagement chamber may cause fluctuations in speed and output of the engine serving as the prime mover. This degrades the drivability of the vehicle.

SUMMARY OF THE INVENTION

Therefore, it is a principle object of the present invention to provide an improved slip control for a friction clutch of a torque converter which can avoid the problems of the conventional techniques.

Another and more specific object of the present invention is to provide a slip control for friction clutch, in which abrupt changes in the pressure balance between the disengagement chamber and engagement chamber on either side of the friction clutch are reliably prevented.

A further object of the present invention is to provide an improved variable cross-section throttling path geometry which assures a moderate rate of change of cross-section, especially in the intermediate throttling range.

A still further object of the present invention is to provide a specific throttling path geometry which ensures a moderate rate of change of the pressure balance in the intermediate throttling range in order to improve the transition characteristics between the hydrodynamic drive state and the mechanical drive state.

In order to accomplish the above-mentioned and other objects, a slip control mechanism, according to the present invention, comprises a throttling path with a cross-sectional area variable according to the relative displacement of an output element of a torque converter and an output shaft. The throttling path is in communication via a fluid passage with a disengagement chamber opposing one side of a friction clutch. The other side of the friction clutch faces an engagement chamber. The disengagement chamber and the engagement chambers are so arranged as to control slippage of the friction clutch by pressure balance therebetween. The throttling path has a specific geometry which assures moderate changes in the pressure balance between the disengagement chamber and engagement chamber in an intermediate throttling range.

In the preferred construction, the throttling path is so constructed that the rate of change of the throttling cross-sectional area satisfies the inequality $$d^2S/dx^2 \geq 0$$

where
S is the cross-sectional area of the throttling path, and
x is the relative displacement of the output element of the torque converter and the output shaft.

In the above case, the output element of the torque converter serves as a first throttling element and the output shaft serves as a second throttling element. Though the above-mentioned citations specifically describe the output element and the output shaft as causing variation of the throttling rate of the throttling path for clutch slippage control, they may be replaced by any components which satisfy the above specific relationship between relative displacement and throttle area. For example, in the case of U.S. Pat. No. 3,966,031, either of the turbine and the turbine hub can be used as the first throttling component and the other may constitute the second throttling element.

BRIEF DESCRIPTION OF THE DRAWINGS

The present invention will be understood mode fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
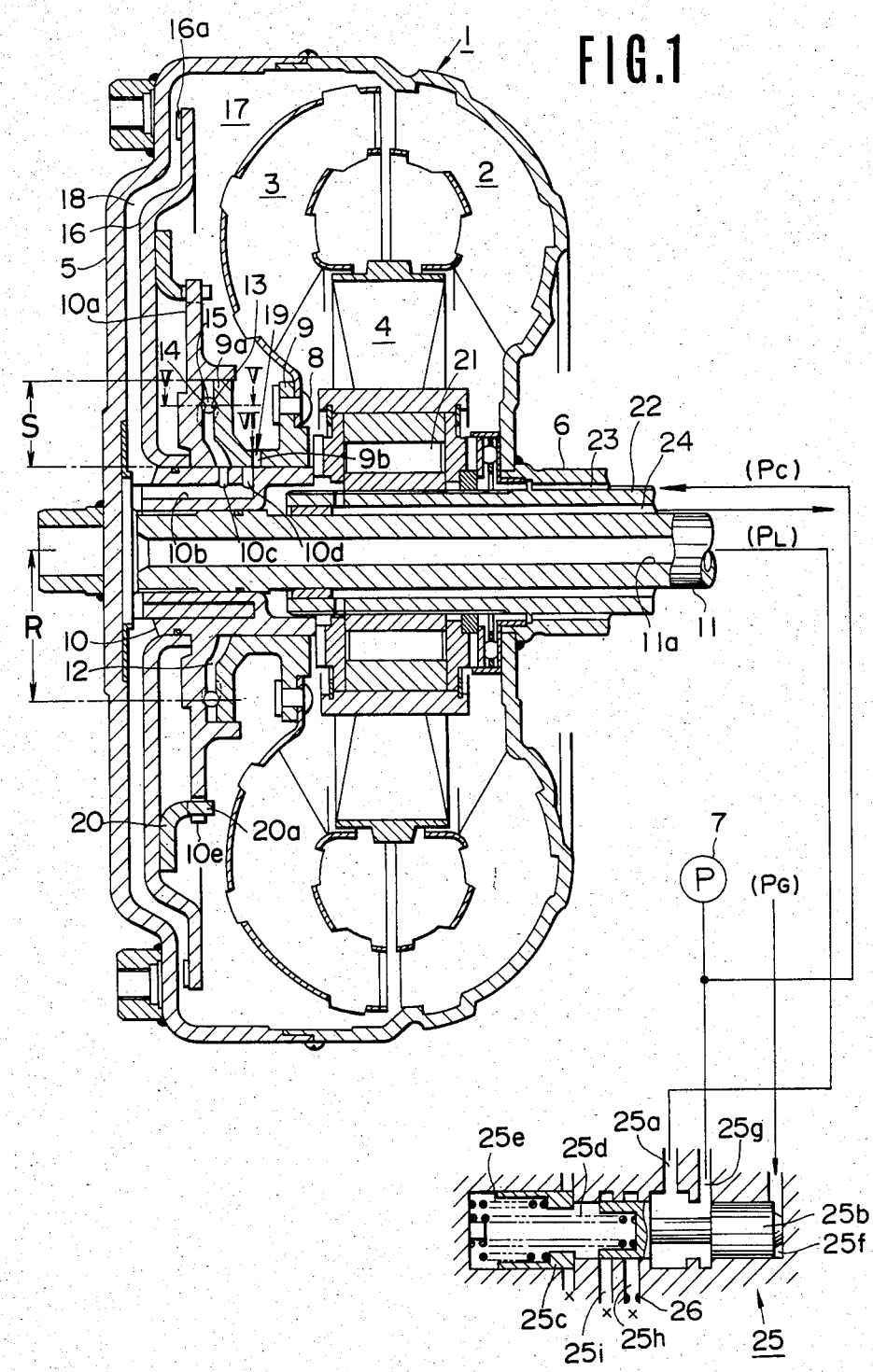
FIG. 1 is a longitudinal section of a torque converter with a friction clutch assembly to which the preferred embodiment of a slip control mechanism according to the present invention is applied.

Referring now to the drawings, FIG. 1 shows a torque converter 1 disposed between a prime mover such as an internal combustion engine (not shown) and an automatic power transmission assembly (not shown). The torque converter generally comprises a pump impeller 2, a turbine or turbine runner 3 and a stator 4.

The pump impeller 2 serves as a power input member. The pump impeller 2 is firmly secured to an input shell or converter cover 5 in a per se well-known manner, for example by welding. The input shell 5 is coupled to an output shaft of a prime mover, such as an internal combustion engine (not shown). The pump impeller 2 is thus driven by the engine output transmitted through the input shell 5. The pump impeller 2 is also secured to a hollow sleeve shaft 6 which is coupled to a conventional gear pump 7 to drive. Thus the pump impeller 2 drives the gear pump 7 by transmitting its rotation through the sleeve shaft 6.

The pump impeller 2 and the input shell 5 define an enclosed space within the torque converter 1. The turbine runner 3 is disposed within the enclosed space between the pump impeller 2 and the input shell 5. The turbine runner 3 is mounted on a turbine hub and secured to the latter in a conventional manner, such as by means of rivets 8. The turbine hub 9 is rotatably coupled to an output hub 10. The output hub 10 is splined to a torque converter output shaft 11 so as to be fixed thereto both angularly and axially. The turbine runner 3 is so coupled to the pump impeller 2 as to form a well-known toroidal circuit. The turbine hub 9 and the output hub 10 both have radial flanges 9a and 10a. The flanges 9a and 10a oppose to each other in a spaced-apart relationship. The outer edges of flanges 9a and 10a are connected to define a fluid pressure chamber 12. A plurality of matching, arcuate, contoured impressions 13 and 14 are formed at radially symmetrically separated points on the surfaces of the respective flanges 9a and 10a opposing each other across the fluid pressure chamber 12. A ball 15 is received in the impressions 13 and 14. The impressions 13 and 14 and the ball 15 constitute a cam mechanism which will be described later in detail with reference to FIG. 5, in conjunction with the opposing surfaces of the flanges 9a and 10a. This cam mechanism serves to drive the turbine hub 9 axially as part of a throttling path area adjusting operation explained later.

A friction clutch 16 is mounted on the output hub so as to allow axial movement relative to the latter. The friction clutch 16 has a clutch facing 16a near its radially outer edge opposing the internal surface of the input shell 5 for friction engagement therewith when clutch 16 is driven into contact therewith. The friction clutch 16 and the input shell 5 define a disengagement chamber 18 in fluid communication with the fluid pressure chamber 12 via an axial passage 10b and a contiguous radial passage 10c. In addition, the friction clutch 16 and the turbine runner 3 define an engagement chamber 17. This engagement chamber 17 is in fluid communication with the disengagement chamber via a throttling path 19 defined by the variable overlap between radial openings 10d and 9b respectively formed radially through the output hub 10 and the turbine hub 9, and continuous with the axial passage 10b.

An essentially L-shaped annular mounting member 20 is secured to the engagement chamber side of friction clutch 16. Teeth 20a formed along the radially inward, free edge of the mounting member 20 engage teeth 10e formed in the flange 10a of the output hub 10. Engagement between the teeth 20a and 10e ensures transmission of driving force between the friction clutch 16 and the output hub 10. The teeth 20a and 10e are so arranged as to maintain engagement therebetween at any axial position of the friction clutch.

A friction clutch coupled to the output hub by means of an annular mounting member has been disclosed in the U.S. Pat. No. 4,305,487, to Yoshio SUNOHARA, and commonly assigned to the assignee of this invention. The contents of U.S. Pat. No. 4,305,487 is hereby incorporated by reference. In addition, fluid pressure control between the engagement chamber and the disengagement chamber similar to the shown embodiment has been disclosed in the co-pending U.S. patent application Ser. No. 545,198, filed on Oct. 25, 1983. The contents of the above-identified co-pending U.S. patent application is also hereby incorporated by reference.

The disengagement chamber 18 is also in fluid communication with a lock-up control valve 25 via a central axial passage 11a defined in the torque converter output shaft 11. The axial passage 11a is connected to an internal bore of the lock-up control valve 25 via an output control port 25a. A spool 25b, a plug 25c and springs 25d and 25e are disposed coaxially within the internal bore. A governer pressure Pg proportional to vehicle speed is introduced into a chamber 25f defined by one end of spool 25b and the internal periphery of the lock-up control valve bore. The lock-up control valve 25 also has an inlet port 25g establishing fluid communication between the internal bore of the lock-up control valve on the other side of spool 25b and the gear pump 7 driven by the pump impeller 2 as set forth above. The valve bore is further in fluid communication with a fluid reservoir (not shown) through drain ports 25h and 25i. A flow-restriction orifice 26 is the drain port 25h regulates the fluid flow rate therethrough. The output pressure of the gear pump 7 corresponds to the fluid pressure Pc in the converter chamber of the torque converter.

The spool 25b is biased toward the chamber 25f by means of the springs 25d and 25e. When the governer pressure Pg is introduced, the spool 25b shifts axially to a point at which the fluid pressure in the chamber 25f and the spring forces applied by the springs 25d and 25e balance each other.

Figure 2:
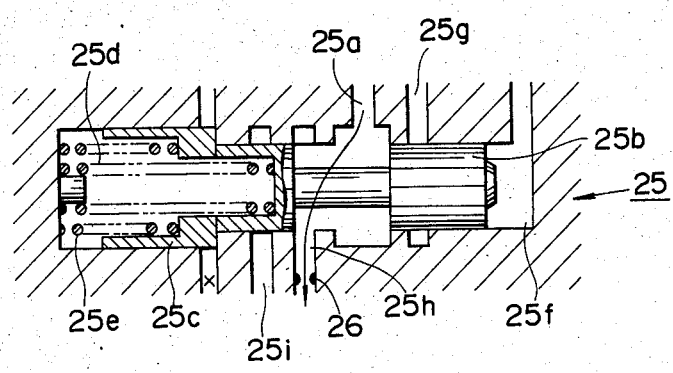
FIG. 2 is a cut-away view in partial section of a lock-up control valve in a position wherein slip control for a friction clutch assembly is performed.
Figure 3:
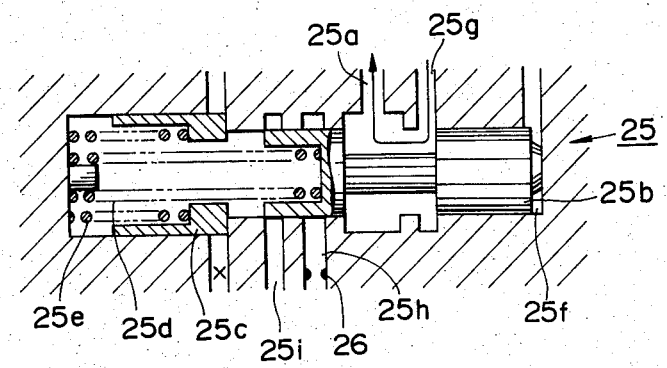
FIG. 3 is an illustration similar to FIG. 2 showing the lock-up control valve in a position wherein the torque converter operates in hydrodynamic drive mode.
Figure 4:
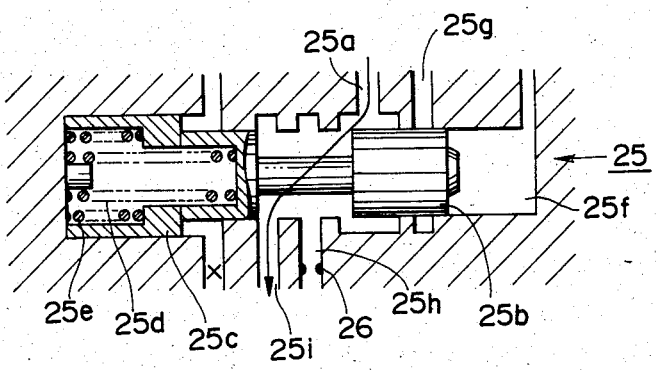
FIG. 4 is an illustration similar to FIG. 2 showing a lock-up control valve in a position wherein the torque converter operates in mechanical drive mode.

FIGS. 2 to 4 show different axial positions of the spool 25b in various operational modes of the lock-up control valve 25.

FIGS. 1 and 3 show a state wherein the friction clutch is fully disengaged from the input shell 5. As set forth above, since the goverver pressure is proportional to the vehicle speed, it will be low when the vehicle speed is low. When the governer pressure Pg is lower than the set pressure provided by the springs 25d and 25e, the spool 25b is held in the position shown in FIG. 3. In this spool position, the inlet and output ports 25g and 25a are both in communication with the valve bore. Therefore, the output pressure from the gear pump 7 is fed to the disengagement chamber 18 through the outlet port 25a and the axial passage 11a. Since the fluid pressure supplied to the disengagement chamber 18 at this spool position is substantially equal to that in the engagement chamber 17, and thus the fluid pressures at both sides of the friction clutch balance, the friction clutch 16 remains separated from the opposing surface of the input shell 5, preventing friction engagement between the input shell 5 and the turbine runner 3.

In this mode, the turbine runner 3 is driven by the working fluid in the enclosed space of the torque converter 1 impelled by the pump impeller 2. The impelled working fluid is first directed to the turbine runner 3 to drive the same and then returns to the impeller 2 via the stator 4. The torque thus applied to the turbine runner 3 is transmitted to the output shaft 11 through the turbine hub 9 and the output hub 10.

As will be appreciated herefrom, when the vehicle speed is lower than a given speed, e.g. 20 km/h, the torque converter works in hydrodynamic drive mode, converting the engine output torque through the hydrodynamic cooperation of the pump impeller 2, the turbine runner 3 and the stator 4.

When the vehicle speed exceeds the given speed and thus the governer produces a fluid pressure greater than the effective pressure of the springs 25d and 25e, the spool 25b shifts to the position shown in FIG. 2, where the frictional engagement between the input shell 5 and the friction clutch 16 can be effectively controlled. In this case, the spool 25b the input port 25g to prevent fluid communication between the gear pump 7 and the outlet port 25a. At the same time, the plug 25c shifts axially to expose the drain port 25h to the valve bore. Therefore, the outlet port 25a is in communication with the drain port 25h via the valve bore. Thus, the fluid pressure in the disengagement chamber 18 drains through the drain port 25h. Since the drain port 25h is provided with the orifice 26, the fluid flow rate through the drain port 25h is limited.

On the other hand, at this valve position, the disengagement chamber 18 remains in communication with the engagement chamber 17, but only via the throttling path 19. Therefore, the fluid pressure differential between the disengagement chamber 18 and the engagement chamber 17 is determined by the cross-sectional area of the throttling path 19. The pressure difference between the disengagement chamber 18 and the engagement chamber 17 decreases as the throttling path widens; specifically the fluid pressure in the disengagement chamber increases as the cross-sectional area of the throttling path. This weakens the biasing force driving the friction clutch 16 toward the opposing surface of the input shell 5. The slippage between the friction clutch 16 and the input shell 5 increases as the cross-section of the throttling path 19 increases. Conversely, the pressure difference between the disengagement chamber 18 and the engagement chamber 17 increases as the cross-section of the throttling path 19 decreases. This would strengthen the frictional engagement between the friction clutch 16 and the opposing surface of the input shell 5 and accordingly reduce slippage of the friction clutch.

Further increase of the vehicle speed beyond a second given speed, e.g. 60 km/h, causes the governer pressure Pg to completely overcome the force of springs 25d and 25e. As a result, the spool 25b shifts to the position shown in FIG. 4. In this position, the input port 25g remains closed. The drain ports 25h and 25i are both opened to drain all of the working fluid from the disengagement chamber via the axial passage 11a and the outlet port 25a. As a result, the fluid pressure in the disengagement chamber 18 drops significantly, maximizing the fluid pressure difference between the disengagement chamber 18 and the engagement chamber 17. As a result, the friction clutch 16 is held firmly in contact with the opposing surface of the input shell 5, thus directly receiving all of the rotational torque imparted by the engine output shaft to the input shell. Since the friction clutch 16 engages the turbine runner 3 through the annular member 20, the turbine runner 3 is driven by the engine output via direct mechanical drive. Rotation of the turbine runner 3 is transmitted to the output shaft 11 through the turbine hub 9 and the output hub 10.

The cam mechanism 15 between the flanges 9a and 10a of the hubs 9 and 10 transmits rotation of the output hub 10 to the turbine hub 9 and vice versa.

FIG. 5 shows details of the cam mechanism. The impressions 13 and 14 formed on the opposing surfaces of the flanges 9a and 10a follow arcs which are concentric about the torque converter output shaft 11 and have a radius of curvature R. The floors 13a and 14a of impressions 13 and 14 are essentially flat and parallel to each other. The floors 13a and 14a are inclined at an angle $\theta$ with respect to the planes in which the flanges 9a and 10a rotate, which are, of course, parallel to each other.

Figure 5A:
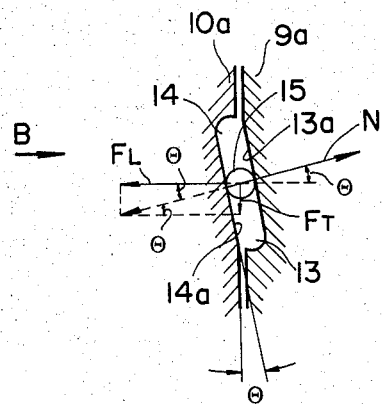
FIG. 5A is a sectional view taken along a cylindrical surface including line V—V of FIG. 1.
Figure 5B:
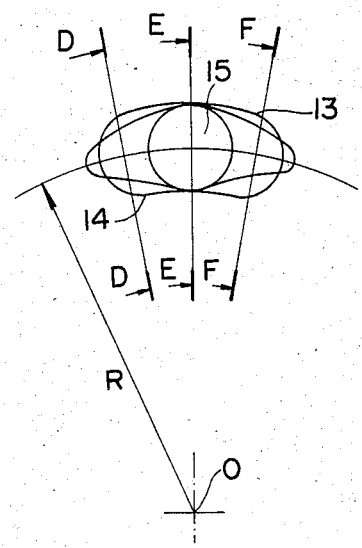
FIG. 5B is a diagram showing three characteristic positions of a cam mechanism.
Figure 5C:
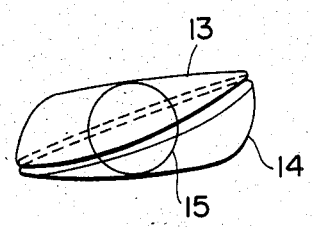
FIG. 5C is a diagram showing the geometry of the cam mechanism in perspective.
Figure 5D:
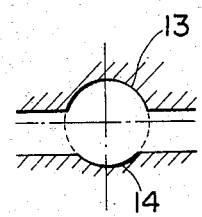
FIGS. 5D-5F are cross-sectional views taken at the positions D, E and F in FIG. 5B, respectively.
Figure 5E:
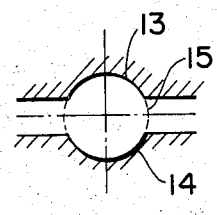
Figure 5F:
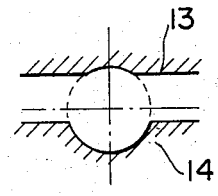

Each pair of impressions 13, 14 forms a capsule retaining the corresponding ball 15, as shown in FIG. 5C. The same clearance is provided for the ball throughout the angular extent of the capsule, as can be seen by comparing FIGS. 5D, 5E and 5F. Thus, as long as the output hub 10 does not rotate relative to turbine hub 9, the ball 15 can move anywhere within the capsule without affecting the axial spacing between the flanges 10a, 9a. However, any movement of the impressions 13, 14 from the alignment shown in FIGS. 5 will result in an axial separation of the flanges 9a, 10a greater than that visible most clearly in FIGS. 5D to 5F.

The turbine hub 9 is subject to a force $F_T$ due to the torque on the turbine runner 3, and a force $F_L$ due to the fluid pressure difference between the engagement chamber 17 and the disengagement chamber 18. The forces $F_T$ and $F_L$ act on the effective area of the turbine hub 9 within the pressure chamber 12. As the friction between the surface of impression 13 and the ball 15 is negligible, it is possible to ignore it. Ignoring the frictional force between the turbine hub 9 and the ball 15, forces $F_T$ and $F_L$ must balance the reacting force N of the ball 15, as shown in FIG. 5. The forces $F_T$ and $F_L$ are given by:

$$F_T = T_T/R \qquad (1)$$

$$F_L = (P_C - P_L)S \qquad (2)$$

where

R is radius of curvature of the impressions, $T_T$ is the torque on the turbine runner 3, S is effective area in the pressure chamber 12, $P_C$ is the pressure in the engagement chamber, and $P_L$ is the pressure in the disengagement chamber.

In the equilibrium state, the force $F_T$ is equal to (N×sin $\theta$) and the force $F_L$ is equal to (N×cos $\theta$). Therefore, the following equation is obtained:

$$F_L \tan \theta = F_T \qquad (3)$$

The torque $T_L$ transmitted through the friction clutch is given by:

$$T_L = K(P_C - P_L) \qquad (4)$$

where

K is a constant determined by the effective area and radius of the friction clutch 16.

From the equations (1) to (4), the formula $T_L \times (S/K)$ tan $\theta = T_T/R$ is obtained. This can be modified to:

$$T_L = (K/S) \times 1/(R \tan \theta) \times T_T$$

Since K, S, R, and $\theta$ are all fixed values, $(K/S) \times 1/(R \tan \theta)$ can be written as a single constant. Thus, the equation can be modified to read $$T_L = K \times T_T \qquad (5)$$

where

K is $(K/S) \times 1/(R \tan \theta)$,

As will be appreciated herefrom, the clutch torque $T_L$ is directly proportional to the turbine torque $T_T$.

As the turbine torque $T_T$ varies, the turbine hub 9 rotates relative to the output hub 10, i.e., their phase relationship changes. As a result, due to the effect of the cam mechanism, the turbine hub 9 moves axially relative to the output hub 10. This axial movement of the turbine hub 9 in turn affects the overlap between the radial openings 10d and 9b which in combination form the throttling path 19.

Figure 6:
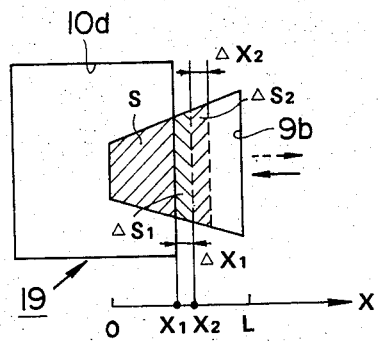
FIG. 6 is a diagram of the throttling path of the preferred embodiment of the slip control mechanism according to the present invention.

As shown in FIG. 6, the radial opening 9b formed through the turbine hub 9 is in the shape of a trapezoid. On the other hand, the radial opening 10d is essentially square or rectangular. The hatched area in FIG. 6 represents the overlap between radial openings 9b and 10d. This hatched area serves as the throttling path 19 for adjusting the rate of fluid flow out of and into the disengagement chamber 18. As set forth above, the turbine hub 9 shifts relative to the output hub 10 due to the effect of the cam mechanism. Variation rate S is a function of the axial stroke of the turbine hub 9. Assuming the turbine hub 9 shifts from the point $x_1$ to the point $x_2$, increasing the path cross-section, the increased area $\Delta S_1$ is obtained. Further shift of the turbine hub 9 through a stroke $\Delta x_2$ in the direction of further increase in path cross-section results in an additional area increase $\Delta S_2$. Due to the shape of the radial opening 9b, subsequent increases $\Delta S_2$ are always greater than initial increases $\Delta S_1$ of equal stroke.

This relationship can be illustrated by the expression $$\frac{\Delta S_2}{\Delta x} - \frac{\Delta S_1}{\Delta x} > 0$$

In addition, the following relationship holds:

$$\frac{\frac{\Delta S_2}{\Delta x} - \frac{\Delta S_1}{\Delta x}}{\Delta x} > 0$$

Therefore, as will be appreciated herefrom, the relationship of the axial stroke x of the turbine hub 9 and the path area S of the throttling path 19 can be represented by $$\frac{d^2 S}{dx^2} > 0$$

It should be noted that the cam mechanism shifts the turbine hub 9 axially relative to the output hub 10 in order to adjust the cross-section of the throttling path 19 so as to establish a balance satisfying the equation (5).

For instance, when the turbine torque $T_T$ increase, upsetting the balance of equation (5), the turbine hub 9 is shifted away from the disengagement chamber 18 to decrease the path cross-section. This accordingly reduces the rate of pressure equalization between the engagement and disengagement chambers 17, 18. When the slip rate between the clutch plate 16 and the input shell 5 is to be controlled, i.e. when the control valve 25 is as shown in FIG. 2, the cross-section of throttle path 19 controls the pressure differential across the clutch plate 16, thus controlling the slip rate.

On the other hand, when the turbine torque $T_T$ decreases, upsetting the balance of equation (5), the turbine hub 9 shifts toward the disengagement chamber 18, thus increasing the cross-sectional area S of the throttling path 19. As the path area increases, the rate of fluid pressure transfer between the engagement chamber and the disengagement chamber increases. The path area increases until the equation (5) is satisfied.

This increase in the cross-sectional area of the throttling path 19 increases the rate of pressure equalization between the disengagement chamber and the engagement chamber. The pressure difference between the disengagement chamber 18 and the engagement chamber 17 thus decreases, moderating frictional engagement between the friction clutch 16 and the opposing surface of the input shell 5. Slippage is thus increased.

As a result, the turbine torque $T_T$ and the torque $T_L$ transmitted through the friction clutch 16 are so balanced as to satisfy the foregoing equation (5).

Figure 13:
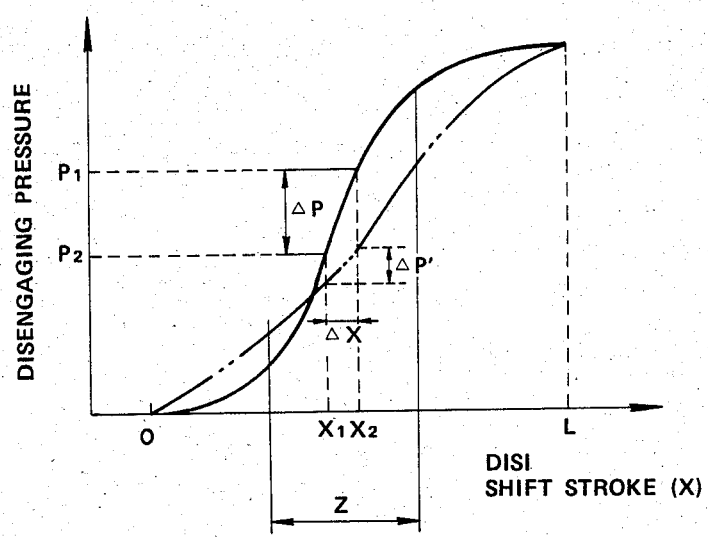
FIG. 13 is a graph of disengaging fluid pressure versus axial stroke, in which the phantom curve represents the performance of the preferred embodiment of the present invention and the solid curve represents that of a prior art system.

As set forth above, according to the shown embodiment, the radial openings 9b and 10d are so arranged as to provide a non-linear change in throttle cross-section as the turbine hub 9 shifts axially. As a result, the behavior of the disengaging pressure with respect to axial stroke of the turbine hub 9 is as illustrated in phantom lines in FIG. 13 which may be compared with that of a prior art system, which has been illustrated in solid lines in FIG. 13. As will appreciated from FIG. 13, the rate of change of the disengagement pressure in the central turbine hub stroke range, in which slip control is effective, is more moderate than that of the prior art.

Figure 11:
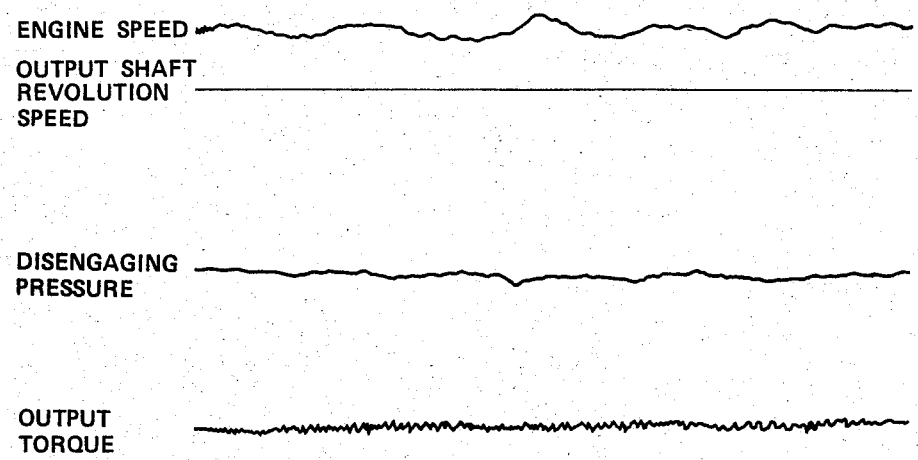
FIG. 11 is a chart of typical variations in parameters in the preferred embodiment of slip control mechanism according to the invention.
Figure 12:
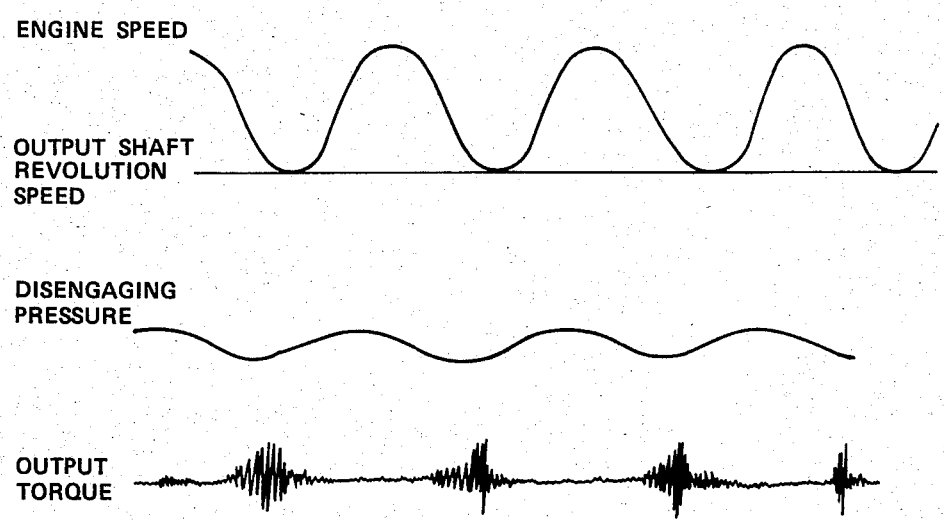
FIG. 12 is a chart of typical variations in the parameters illustrated in FIG. 11, in a typical prior art system.

Therefore, according to the present invention, the lock-up disengaging pressure is regulated to satisfactorily stabilize engine operation and regulate the output torque. Typical behavior of the engine speed, torque converter revolution speed, disengaging pressure and the output torque of a torque converter using the shown embodiment of slip control mechanism are illustrated in FIG. 11. This may be compared with FIG. 12 in which engine speed, torque converter output speed, disengagement pressure and output torque of a torque converter with a conventional slip control mechanism have been illustrated. As will be appreciated from comparison of FIGS. 11 and 12, engine speed fluctuation in the torque converter of the present invention is substantially reduced relative to that of the conventional torque converter. Also, fluctuations in the output torque are smaller than in the prior art. This effect is achieved by regulating disengaging pressure by way of a throttling path, the second derivative of the area of which with respect to the torque on the clutch is a positive value. This moderates variations in the disengaging pressure of the friction clutch, thus preventing hunting during slip control between mechanical drive and hydrodynamic drive.

Although the present invention has been disclosed in terms of the specific embodiment of slip control mechanism with a throttling path of a specific shape, the same or similar effect can be achieved with any shape or form of throttling path which satisfies the equation:

$$\frac{dS^2}{d^2x} > 0$$

as set forth above. For example, the radial openings 9b and 10d defining the throttling path 19 may assume any of the various shapes shown in FIGS. 7 to 10.

Figure 7:
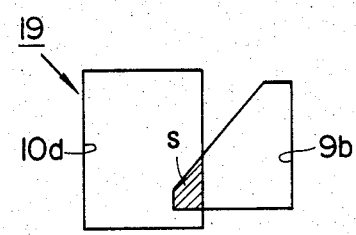
FIGS. 7 to 10 show various modifications of the throttling path of FIG. 6.
Figure 8:
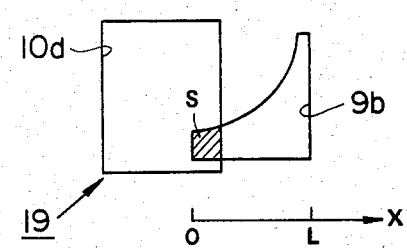
Figure 9:
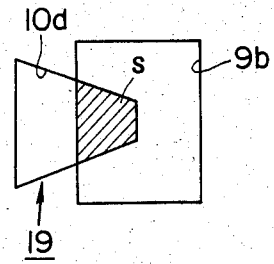
Figure 10:
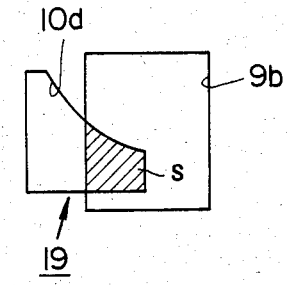

In FIGS. 7 and 8, the shape of the radial openings 9b is modified. In these modifications, the width of the radial opening 9b gradually expands towards the edge remote from the radial opening 10d. The same effects achieved by the are exhibited by these modifications. The modifications shown in FIGS. 9 and 10 show other alternatives in which the radial openings 10d are formed so that the width thereof increases towards the edge remote from the opening 9b.

It should be further noted that same or similar effects can be achieved by forming both of the radial openings in non-rectilinear shapes.

Furthermore, it would be possible to apply the arrangement of the throttling path according to the invention to any type of slip control. For example, the arrangement of the mutually opposing openings as set forth in the present invention could be applied to the throttling arrangement disclosed in U.S. Pat. No. 3,966,031 in which the throttling path is defined by axially extending openings formed in an annular portion of the turbine runner and in the turbine hub. Even for a torque converter constructed as described in the above-identified U.S. Patent, the throttling path arrangement according to the invention will provide the same or similar effects.

Therefore, in accordance with the present invention, transition characteristics between mechanical drive and hydrodynamic drive can be significantly improved.

What is claimed is:

1. A torque converter with a lock-up friction clutch comprising:
   an input member driven to rotate by a prime mover;
   an impeller rotating with said input member;
   a turbine independently rotatable and cooperative with said impeller to form a toroidal circuit by which torque is exerted on said turbine by said impeller in a hydrodynamic drive mode;
   an output member freely rotatable and coupled to said turbine to rotate therewith at a variable phase;
   a friction clutch movable into and out of contact with said input member to establish frictional engagement to a variable degree with said input member in a mechanical drive mode;
   hydraulic means associated with said friction clutch for moving the latter between a first state enforcing said mechanical drive mode and a second state enforcing said hydrodynamic drive mode, said hydraulic means including first and second fluid chambers on opposite sides of said friction clutch for moving said friction clutch in accordance with the fluid pressure difference therebetween;
   means establishing fluid communication between said first and second fluid chambers; and
   slip control means, associated with said passage means, for controlling fluid flow rate through said passage means for adjusting said fluid pressure difference, said slip control means including a throttle of variable cross-section disposed within said passage means for controlling the fluid flow rate, said throttle being so arranged that its cross-section increases to reduce the fluid pressure difference in a greater than linear relationship with the torque on said turbine.

2. The torque converter as set forth in claim 1, wherein said slip control means comprises a first stationary component defining an opening with a given area and a second movable component defining an opening with a given area, said opening of said second component partially overlapping the opening of said first component to define the throttle, the degree of overlap being controlled to adjust the throttle cross-section.

3. The torque converter as set forth in claim 2, wherein the width of the opening of at least one of said first and second component increases toward the end remote from the opening of the other component.

4. The torque converter as set forth in claim 3, wherein said second component shifts so as to reduce the degree of overlap with said first component as the turbine torque increases and to increase the degree of overlap as the turbine torque decreases.

5. The torque converter as set forth in claim 4, wherein said first stationary component comprises an output hub connected to said output member and said second component comprises a turbine hub firmly connected to said turbine and cooperatively associated with said output hub, for limited rotational and axial movement with respect thereto.

6. A lock-up torque converter system comprising:
   a torque converter including a stationary sleeve, an input shell driven by a prime mover, a pump impeller secured to said input shell and cooperating therewith to define an enclosed space, a turbine runner disposed independently rotatably in said enclosed space between said input shell and said pump impeller and cooperating with said pump impeller to form a toroidal circuit, and an output hub coupled to said turbine runner;
   a hydraulically actuated friction clutch disposed between said turbine runner and said input shell and defining an engagement chamber said clutch and said turbine runner as well as a disengagement chamber between said clutch and said input shell, and said friction clutch being engageable to an adjustable degree with said input shell to apply torque to said output hub, said degree of engagement depending upon the pressure difference between said engagement chamber and said disengagement chamber;

first means defining a fluid communication passage between said engagement chamber and said disengagement chamber for fluid communication therebetween;

second means defining a throttle of variable cross-section within said communication passage which determines the rate of fluid flow therethrough and thereby controls the fluid pressure difference between said engagement chamber and said disengagement chamber; and third means, responsive to variation of turbine torque, to adjust the cross-section of said throttle depending upon the turbine torque, a second derivative of the cross-section of said throttle with respect to the turbine torque being positive, so that said cross-section of said throttle increases to reduce the fluid pressure difference in a greater than linear relationship with the torque on said turbine.

7. The torque converter as set forth in claim 6, wherein said second means comprises a first component defining part of said communication passage and a second component defining another part of said communication passage, said first and second components being movable relative to each other to adjust the cross-section of said throttle.

8. The torque converter as set forth in claim 7, wherein said third means actuates one of said first and second components to a position corresponding to the magnitude of the torque on said turbine runner.

9. The torque converter as set forth in claim 8, wherein said first and second component comprise openings overlapping each other in such a manner that the cross-section of said throttle is determined the degree of overlap of said openings.

10. The torque converter as set forth in claim 6, further comprising a turbine hub interposed between said turbine runner and said output hub for transmission of turbine torque to said output hub, and wherein said second means comprises first and second openings formed in said turbine hub and output hub so as to oppose each other with a variable degree of overlap.

11. The torque converter as set forth in claim 10, where said third means is a cam mechanism for shifting said turbine hub relative to said output hub in order to adjust the degree of overlap of said openings, said cam mechanism shifting said turbine hub in accordance with the torque on the turbine runner.

12. The torque converter as set forth in claim 11, wherein one of said first and second openings has a constant width in the direction transverse to the direction of travel of said turbine hub, and the other has a width which gradually increases toward the edge remote from said first opening.

13. The torque converter as set forth in claim 12, wherein said disengagement chamber is connected to a pressure control valve which responds to a governor pressure byassuming one of a first valve position in which the fluid pressure is the disengagement chamber decreases to approximately zero to establish frictional engagement between said friction clutch and said input shell, a second valve position in which the fluid pressure in the disengagement chamber is increased to a level high enough to disengage said friction clutch from said input shell, and a third valve position in which fluid drains at a limited constant rate from said disengagement chamber, so that the degree of slippage of the friction clutch relative to said input shell depends upon the fluid pressure introduced into said disengagement chamber from said engagement chamber via said throttle.

14. A lock-up torque converter system comprising:
a torque converter including a stationary sleeve, an input shell driven by a prime mover, a pump impeller secured to said input shell and cooperating therewith to define an enclosed space, a turbine runner disposed independently rotatably in said enclosed space between said input shell and said pump impeller and cooperating with said pump impeller to form a toroidal circuit, and an output hub coupled to said turbine runner so as to have limited ranges of pivotal and axial movement with respect thereto;

a hydraulically actuated friction clutch disposed between said turbine runner and said input shell and defining an engagement chamber between said clutch and said turbine runner as well as a disengagement chamber between said clutch and said input shell, and said friction clutch being engageable to an adjustable degree with said input shell to apply torque to said output hub, said degree of engagement depending upon the pressure difference betweeen said engagement chamber and said disengagement chamber;

first means defining a fluid communication passage between said engagement chamber and said disengagement chamber for fluid communication therebetween; and second means defining within said communication passage a throttle of variable cross-section depending upon the torque on the turbine runner, said second means including first and second components, said first component being movable relative to said second component to adjust the throttle cross-section, said second means being so arranged as to satisfy the relationship $$\frac{dS^2}{d^2x} > 0$$

where
S is a path area and
x is the movement of said first component relative to said second component.

15. A torque converter with a friction clutch comprising:
an input member driven to rotate by a prime mover;
a impeller rotating with said input member;
a turbine independently rotatable and cooperative with said impeller to form a toroidal circuit by which torque is exerted on said turbine by said impeller in a hydrodynamic drive mode;
an output member freely rotatable and coupled to said turbine to rotate therewith at a variable phase;
a friction clutch movable into and out of contact with said input member to establish frictional engagement to a variable degree with said input member in a mechanical drive mode;
hydraulic means associated with said friction clutch for moving the latter between a first state enforcing said mechanical drive mode and a second state enforcing said hydrodynamic drive mode, said hydraulic means including first and second fluid chambers on opposite sides of said friction clutch for moving said friction clutch in accordance with the fluid pressure difference therebetween;

means establishing fluid communication between said first and second fluid chambers; and slip control means, associated with said passage means, for controlling fluid flow rate through said passage means for adjusting said fluid pressure difference, said slip control means including a throttle of variable cross-section disposed within said passage means for controlling the fluid flow rate; which throttle comprises a first stationary component defining an opening with a given area and a second movable component defining an opening with a given area, said opening of said second component partially overlapping the opening of said first component to define the throttle, the degree of overlap being controlled to adjust the throttle cross-section to increase cross-section to reduce the fluid pressure difference in a greater rate than linear relative to the torque on said turbine, and said slip control means further comprising a cam mechanism for shifting said second component relative to said first component in order to adjust the degree of overlap of said openings.

16. A lock-up torque converter system comprising:

a torque converter including a stationary sleeve, an input shell driven by a prime mover, a pump impeller secured to said input shell and cooperating therewith to define an enclosed space, a turbine runner disposed independently rotatably in said enclosed space between said input shell and said pump impeller and cooperating with said pump impeller to form a toroidal circuit, and an output hub coupled to said turbine runner;

a hydraulically actuated friction clutch disposed between said turbine runner and said input shell and defining an engagement chamber between said clutch and said turbine runner as well as a disengagement chamber between said clutch and said input shell, and said friction clutch being engageable to an adjustable degree with said input shell to apply torque to said output hub, said degree of engagement depending upon the pressure difference between said engagement chamber and said disengagement chamber;

first means defining a fluid communication passage between said engagement chamber and said disengagement chamber for fluid communication therebetween;

second means comprising a first opening defined in a turbine hub interposed between said turbine runner and said output hub for transmission of turbine torque, and a second opening defined in said output hub, said first and second openings overlapping each other with a variable degree of overlap for defining a throttle of variable cross-section within said communication passage which determines the rate of fluid flow rate therethrough and thereby controls the fluid pressure difference between said engagement chamber and said disengagement chamber; and third means comprising a cam mechanism for shifting said turbine hub relative to said output hub, for adjusting the degree of overlap of said openings in accordance with the torque on the turbine runner.

* * * * *